United States Patent [19]

Moss

[11] 4,317,024
[45] Feb. 23, 1982

[54] ADJUSTABLE AIR-CARBON ARC TORCH

[76] Inventor: Paul B. Moss, 202 S. Lansing, Tulsa, Okla. 74102

[21] Appl. No.: 161,030

[22] Filed: Jun. 19, 1980

[51] Int. Cl.$^3$ .............................................. B23K 9/28
[52] U.S. Cl. ...................................... 219/144; 219/70
[58] Field of Search .......................... 219/138, 144, 70

[56] References Cited

U.S. PATENT DOCUMENTS 4,150,276  4/1979  Moss .................................... 219/144

FOREIGN PATENT DOCUMENTS 677846  8/1979  U.S.S.R. ................................ 219/70

*Primary Examiner*—Elliot A. Goldberg
*Attorney, Agent, or Firm*—Head and Johnson

[57] ABSTRACT

A torch for a carbon electrode, the torch having a body with a conductive electrode support affixed to the forward end and means at the rearward end for attachment of a voltage source and air pressure, the body and electrode having a passageway for ejection of air forwardly of and along the electrode, a pair of elongated paralleled bail members extending from the body and to either side of the electrode support and an electrode engagement member secured between the outer ends of the bail members, the carbon electrode being receivable between the electrode engagement member and the electrode support, the bail members being deflected towards the electrode support thereby retaining the electrode in selected positions and wherein the user positions the carbon electrode by deflecting the bail members rearwardly relative to the electrode support.

19 Claims, 10 Drawing Figures

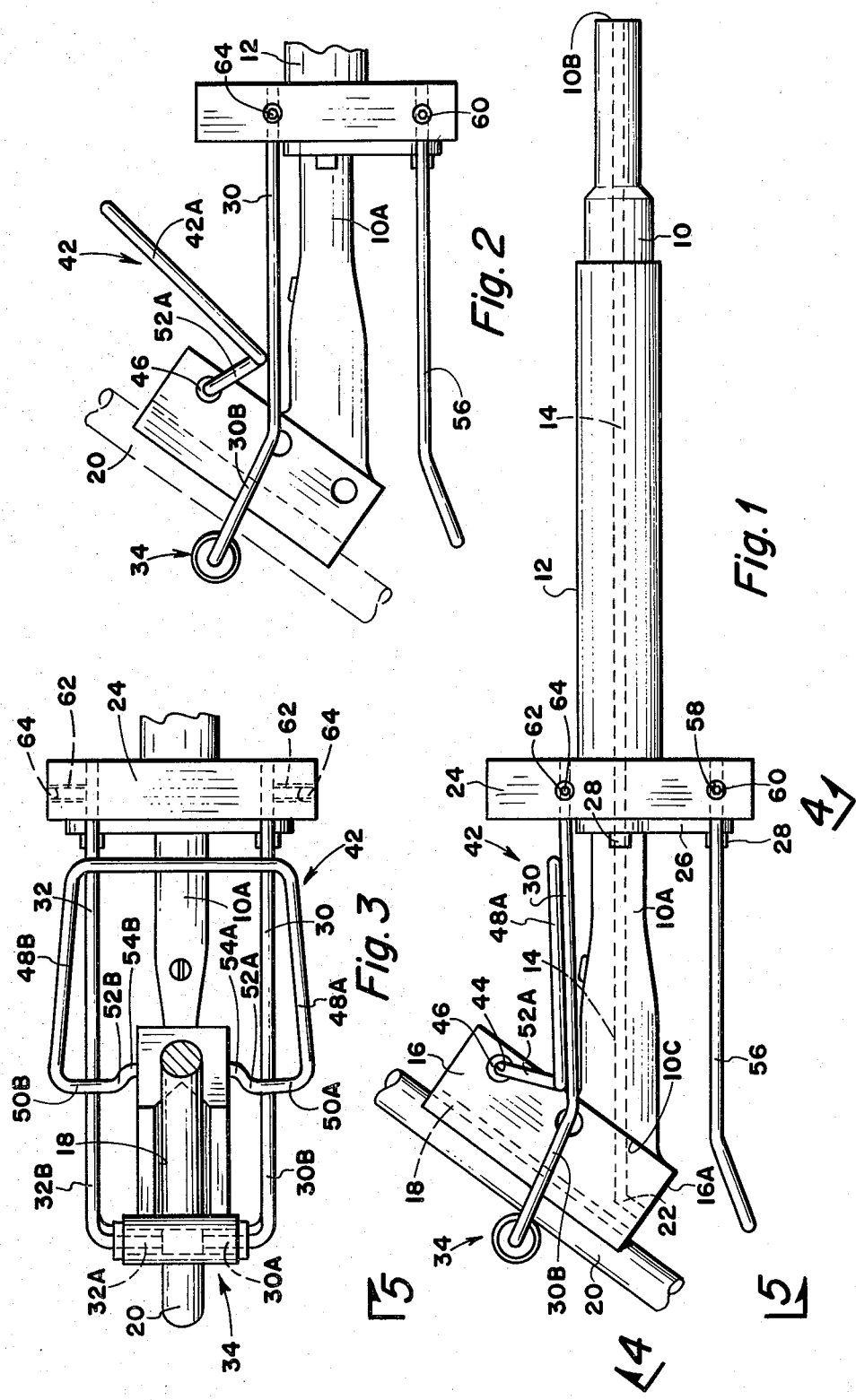

ADJUSTABLE AIR-CARBON ARC TORCH

BACKGROUND OF THE INVENTION

1. Field of the Invention

This invention relates to air-carbon electrodes utilized for cutting metal. The invention provides a torch for holding such carbon arc electrodes, the torch having an air passageway and means for directing air under pressure to dispel molten metal. The invention is most particularly concerned with improved means of selectably retaining carbon electrodes in position in the torch.

2. Description of the Prior Art

The use of carbon electrode torches is well known. For examples of types of air-carbon arc electrode holders, reference may be had to U.S. Pat. Nos. 4,150,276 and 4,045,649. When a carbon arc electrode is employed for cutting metal, high amperage currents are employed and, means must be provided for directing a stream of air from the torch to dispel molten metal. Since high current amperages are required, the torch must provide a means of affording low resistance contact between the torch and the electrode, otherwise heating and arcing occurs. As the electrode is consumed by the cutting operation, it must frequently be adjusted relative to the torch by the user to ensure that the proper length of electrode extends from the torch. Thus, the torch holder for an air-carbon arc electrode must provide the dual and somewhat opposing characteristics of affording a low resistance contact between the torch and the electrode for high amperage transfer and at the same time provide a means where the user can readily and expeditiously position the electrode in the holder.

Since economy of workmanship precludes an electrode holder in which screw-type devices are utilized for securing the electrode to the holder, torches must be designed so that the operator can release engagement of the torch with the electrode and readily reposition the electrode without the use of tools, such as screw drivers, or wrenches, and, while utilizing heavy gloves which are customarily required to protect the hands of the operator. The prior art, as represented by U.S. Pat. Nos. 4,150,276 and 4,045,649 previously referred to, disclose air-carbon arc electrode holders which accomplish the results desired of a torch for this purpose. However, there are some disadvantages and limitations in the prior art, and it is therefore an object of this invention to provide an improved carbon arc electrode holder. Most specifically, it is an object of this invention to provide an air-carbon arc electrode torch having improved means of securing an electrode to the torch in a manner wherein the electrode may be more readily and expeditiously positioned by the user and at the same time in an arrangement reducing arcing between components of the torch. Thus, an object of the invention is to provide a torch having improved ease of use and longer life.

These general objects as well as other and more specific objects of the invention will be fulfilled in the attached description and claims taken in conjunction with the drawings.

SUMMARY OF THE INVENTION

A holder for an air-carbon arc electrode (which is also referred to as a torch), is provided. The holder is formed of a body of conducting material having a forward and a rearward end. The rearward portion of the body has an insulated covering and is arranged to be engaged by the hand of the user whereby the holder is manipulated. The body includes provisions at the rearward end of attachment of an electrical conductor by which a low-voltage, high-amperage current is provided to the body. The body has a central passageway and means is provided at the rearward end of the body for attachment of a hose whereby air under pressure is supplied to the body.

Affixed to the outer end of the body is an electrode support which has an air passageway therein communicating with the passageway in the body. The support has a forward and rearward end, and the passageway extends through the forward end so that a jet of air is discharged when the torch is in use. The electrode support has an elongated groove in the top surface which is configured to receive a cylindrical elongated carbon electrode. An insulated block is affixed to the body and spaced from the electrode support. A pair of elongated paralleled bail members extends from the block and to either side of the electrode support. The bail members each have an inner and outer end, the inner ends being supported in the block and the outer ends being bent at 90° so that they are in common axial alignment and above the electrode support. An electrode engagement member is secured between the outer ends of the bail members. The electrode engagement member is in the form of a cylindrical device having an axial opening therethrough which receives the outer ends of the bail members. The bail members are flexibly disposed to move the electrode engagement member towards the electrode support so that when a carbon electrode is placed between the support and the engagement member it is securely held in position providing a low resistance contact between the electrode and the support. When the user desires to change the position of the electrode, the bail members are deflected rearwardly from the electrode support. In one embodiment a wire lever pivoted to the electrode support is employed to provide tension on the bail members.

DESCRIPTION OF THE DRAWINGS

FIG. 1 is an elevational side view of a torch embodying the principals of this invention, an electrode held in the torch being shown in fragmentary view.

FIG. 2 is a view as in FIG. 1 of the forward portion of the torch and showing the bail member in released position wherein the electrode may be adjusted relative to the electrode support.

FIG. 3 is top a top view of the electrode holder as shown in FIG. 1.

DETAILED DESCRIPTION OF THE PREFERRED EMBODIMENT

Figure 4:
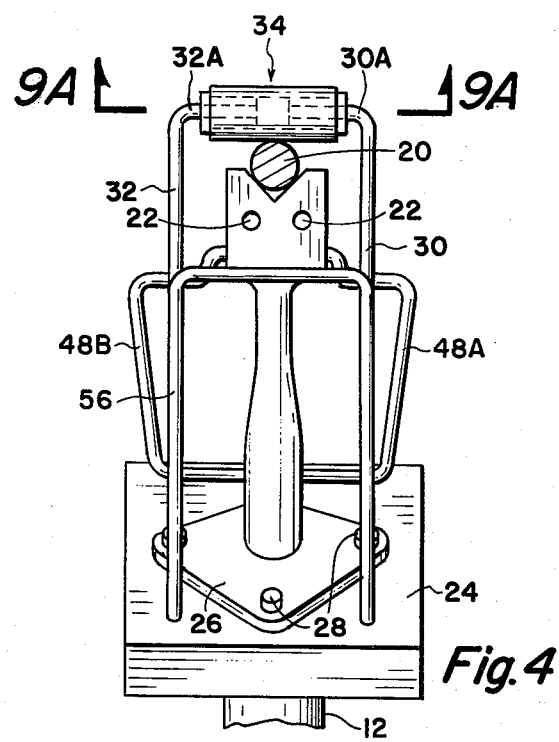
FIG. 4 is a front view of the electrode holder taken along the lines 4—4 of FIG. 1.

Referring now to the drawings and to FIGS. 1 through 5, a first embodiment of the invention is illustrated. A body 10 of conductive material is employed. The body has a forward portion 10A. Positioned around the intermediate and rearward portion of the body is an insulating cover 12. The cover 12 provides a hand grip for the user allowing the torch to be readily manipulated by the user.

The rearward end 10B of the torch body is adapted to receive a hose (not shown) by which a source of air pressure is applied to the torch. In addition, a conductor (also not shown) is attached to the rearward end of the body as a means of providing a high-current, low-voltage potential to the body.

The body 10 has a central passageway 14 therethrough so that air pressure applied is conducted through the body to the forward end 10C.

Secured to the body forward end 10C is an electrode support 16. The support 16 is also formed of conductive material and includes a V-shaped groove 18 in the upper surface. Groove 18 is configured to slidably receive a carbon electrode 20 and to provide good electrical contact between the electrode and the electrode support 16.

Figure 5:
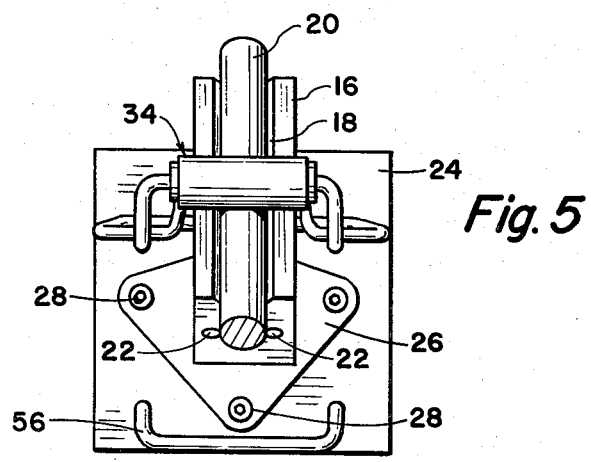
FIG. 5 is an additional front view taken along the line 5—5 of FIG. 1.

The electrode support 16 includes a passageway 22 which communicates with the passageway 14 in the body 10 to receive the flow of air therethrough. Passageway 22 extends to the forward end 16A of the support. While one or more passageways may be employed in the support 16, the preferred arrangement includes the use of two as shown in FIGS. 4 and 5. These permit jets of air to flow along and parallel the electrode 20 to displace molten metal formed as the electrode is used for cutting purposes.

The torch described to this point is more or less of standard design as revealed in prior art, including the issued U.S. patents cited earlier referred to. The important object of this invention is to provide improved means of insuring good electrical contact between electrode 20 and electrode support 16 in an arrangement which permits the user of the torch to expeditiously change the position of the electrode relative to the holder.

Secured to body 10 at an intermediate point spaced from support 16 is an insulated block 24, which may be made of a material such as Bakelite or other heat and electrically resistive plastics or ceramics. In the illustrated arrangement the body front portion 10A is a separate unit from the rearward portion of the body and is supported to the block 24 by a flange 26 and bolts 28. Electrical continuity is provided between the body 10 and body forward portion 10A and the passageway 14 between these elements is common therethrough.

Extending from block 24 is a pair of elongated paralleled bail members 30 and 32 each of which is in the form of stiff, flexible rods or heavy gauge wire. The outer ends of each of the bails is bent at 90° to extend towards each other in a common axis, the bent ends being indicated by numerals 30A and 32A. Received on the end portions 30A and 32A is an electrode engagement member generally indicated by the numeral 34, which is preferably cylindrical and functions to apply retentive force against the electrode 20 to force it into engagement with the electrode support 16.

Figure 9A:
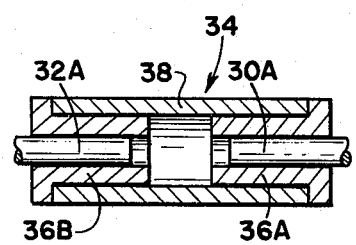
FIG. 9A is a cross-sectional view of the electrode engagement member taken along the line 9—9 of FIG. 4.
Figure 9B:
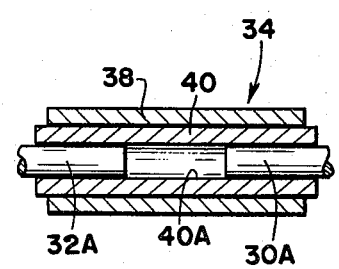
FIG. 9B is a cross-sectional view as in FIG. 9A but showing an alternate arrangement of the electrode engagement member.

The electrode engagement member 34 is shown in cross-section in FIGS. 9A and 9B. In FIG. 9A, cylindrical ferrules 36A and 36B are employed. Each has an axial opening therein receiving the bail ends 30A and 32A. Received on the outside of ferrules 36A and 36B is a tube 38. When the ferrules 36A and 36B are of insulating material, such as of ceramic, the tube 38 may be of metal, such as stainless steel, or othersie, to resist the heat which tends to be transferred from the electrode 20. The bails themselves are insulated since they extend from insulated block 24, however, the additional insulation provided when the ferrules 36A and 36B are insulated is preferred since otherwise the voltage applied to the electrode would be transferred to the bails and increase the possibility of the torch being grounded to conductive objects when the user is moving it about or when it is laid down.

FIG. 9B shown an alternate arrangement including a central tubular insulator 40 having an axial opening 40A therethrough which receives the bail ends 30A, 32A. The insulator 40 serves the same function as the ferrules of FIG. A. Utilizing cylindrical electrode engagement members 34 makes it possible to more readily position electrodes in the torch.

Returning to FIGS. 1 through 5, the bail members 30 and 32 may be straight or, preferably, as shown, including an integral outer portion 30B and 32B which is bent at an angle so as to extend generally perpendicular the V-shaped groove 18 in the electrode support 16 while the main body portion of the bails extend generally perpendicular to the frong surface of insulated block 24.

To apply increased resilient force against electrode 20 by electrode engagement member 34 a wire lever generally indicated by the numeral 42 is employed. The lever 42 is bent in a U-shape with the ends extending towards each other in a common axis and received in opposed openings 44 in electrode support 16. In order to make the wire lever 42 insulated from electrical potential, the opening 44 in the electrode support preferably receives an insulating sleeve 46 which in turn has an opening rotatably receiving the ends of the wire lever. Lever 42 is an integral element having two paralleled legs 42A and 42B and each of the legs is bent at its outer end in three 90° bends. The first portions of the legs are portions 48A and 48B. Portions 50A and 50B extend in a common axial alignment towards each other and perpendicular to the bails 30 and 32. Extending from portions 50A and 50B and at right angles thereto, are upwardly extending portions 52A and 52B, these portions being generally parallel to each other and on opposite sides of electrode support 16. From the portions 52A and 52B, and extending at right angles thereto, are the end portions 54A and 54B which are in a common axis and which are received in the openings 44 in insulating sleeves 46. The wire lever 42 is thereby nutatorially supported to the electrode support 16 and when pivoted downwardly as shown in FIG. 1 wherein the leg portions 48A and 48B are parallel to arms 30 and 32, the arms are pushed downwardly, firmly locking electrode 20 to the electrode support. However, when the lever 42 is pivoted upwardly as shown in FIG. 2, the downward force urged against the arms 30 and 32 is removed, and the force applied against electrode 20 is relieved, permitting the electrode to be repositioned or replaced.

To help protect the body forward position 10A and electrode support 16 from inadvertent contact with grounded metal which would cause arcing and damage to the torch, a forward U-shaped protector member 56 is provided. The protector member 56 is in the form of a bent, stiff rod, the ends of which are received in openings in insulated block 24. The protector member 56 is generally parallel to and spaced from the bail members 30 and 32 and is also spaced forwardly of the forward end 16A of the electrode support. To retain the protector 56 in position in the insulated block, threaded openings 58 are provided which receive allen screws 60. Similarly, openings 62 are provided in block 24 perpendicular the opening which receive the bails 30 and 32, the openings 62 receiving allen screws 64 to retain the bails in position.

Figure 6:
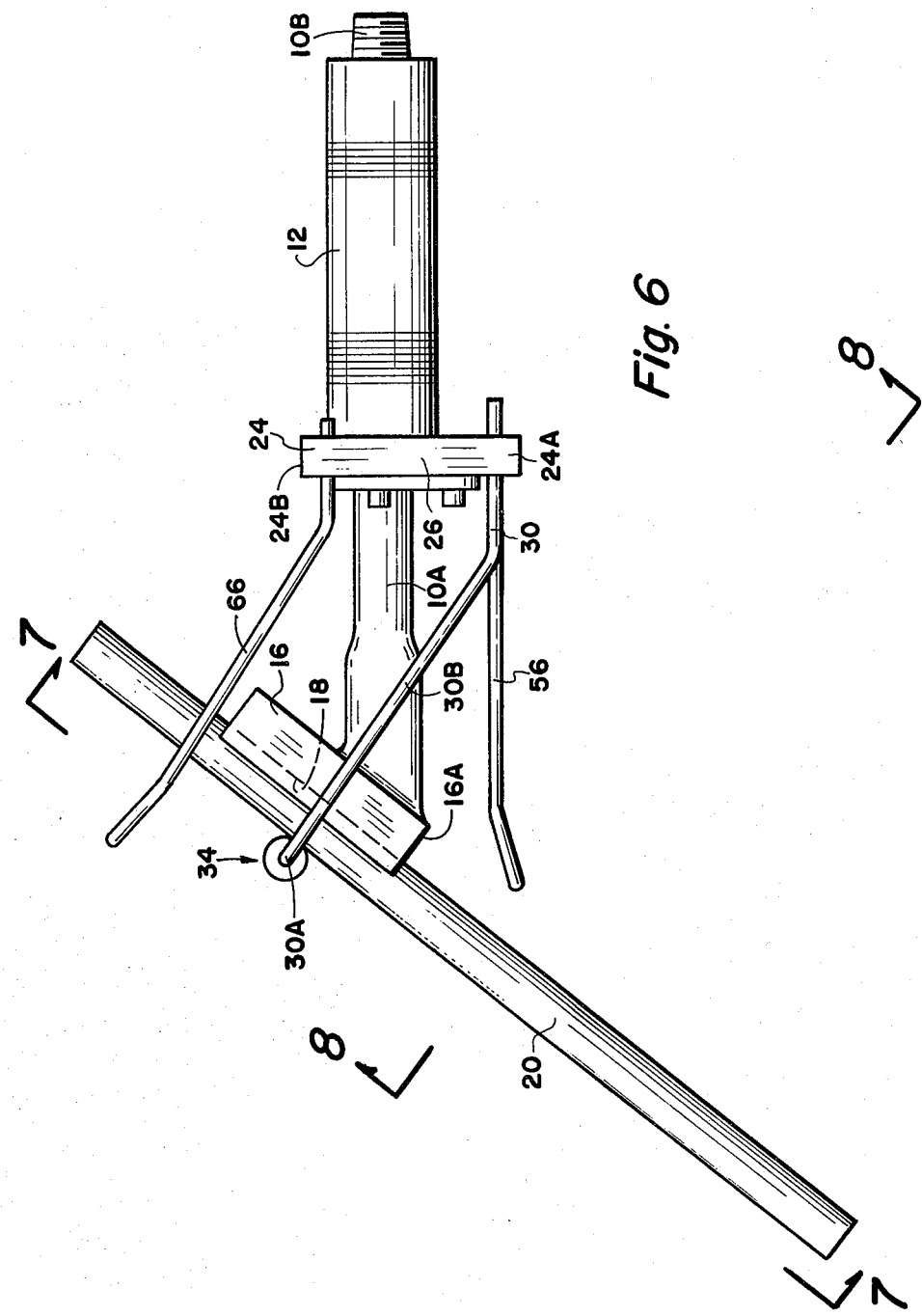
FIG. 6 is a side elevational view of a torch holder showing an alternate embodiment.
Figure 7:
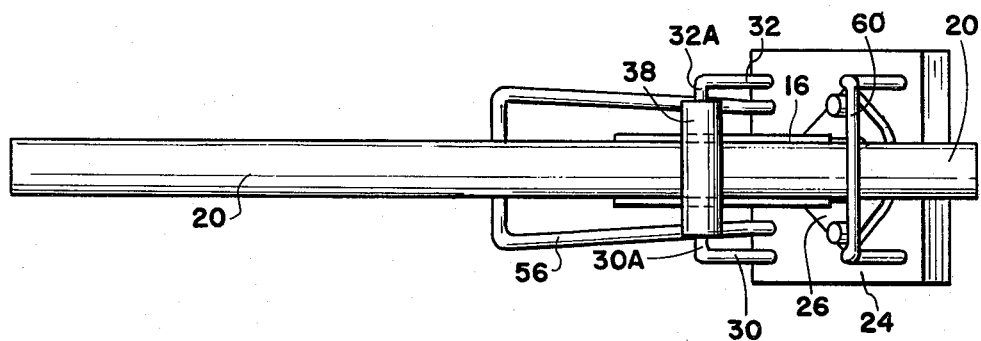
FIG. 7 is a top view taken along the line 7—7 of FIG. 6.
Figure 8:
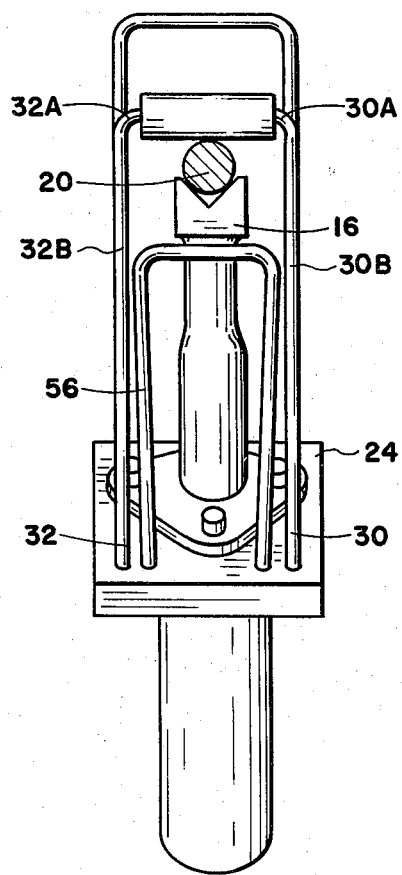
FIG. 8 is a front view of the torch taken along the line 8—8 of FIG. 6.

Referring to FIGS. 6, 7 and 8, an alternate embodiment of the invention is shown. In this embodiment a lever is not employed to maintain tension of the electrode engagement member against electrode 20. Instead, tension is applied by the deflection of the bails themselves. As shown in the drawings, bails 30 and 32 are mounted in the insulated block 24 adjacent to the lower or forward edge 24A. Each of the bails 30 and 32 extend perpendicularly from insulated block 24 and have integral angular portions 30B and 32B which extend generally perpendicular to the V-shaped groove 18 formed in the upper surface of electrode support 16. The outer ends of each of the bails are bent at 90° to form integral end portions 30A and 32A which are in axial alignment and which receive the electrode engagement member 34 of the type described with reference to FIGS. 9A and 9B.

To further protect the body forward portion 10A and electrode support 16, a rearward protector 66 is employed. Protector 66 is similar to the forward protector 56, and is of a U-shaped configuration formed of a stiff rod, the ends being received in the insulated block 24 adjacent the rearward or upper edge 24B. The rearward protector 66 is preferably, as illustrated, of a length so that it extends beyond the electrode support 16 and electrode 20, the electrode passing between the paralleled sides of the protector. In addition to providing increased protection for the torch, the rearward protector 66 is useful in the process of adjusting the position of electrode 20. The user can easily deflect bails 30 and 32 rearwardly by placing the heel of his hand on the top outer end of the rearward protector 56 and with his fingers engaging the bails, pull the bails backward or rearwardly toward the rearward protector 66. This motion relieves the tension of the electrode engagement member 34 with the electrode, allowing the electrode to be repositioned or, a new electrode installed.

The arrangement of FIGS. 6, 7 and 8 have the advantage that no hinged part is employed in retaining and positioning an electrode.

The outer sleeve 38 of the electrode engagement member 34 is subjected to splash and sparks of molten metal as the torch is used to cut metal. Therefore the sleeves 38 can become encrusted with solidified molten metal. By the arrangement of FIGS. 9A and 9B, sleeve 38 is easily removed and replaced to thereby extend the useful life of the torch. In the same manner the bails 30 and 32, the forward protector 56, and the rearward protector 66 are also easily and expeditiously replaceable as these components become damaged beyond use. Thus the torch has a high degree of utility in that it is arranged such that the exposed parts are readily replaceable.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplication, but is to be limited only by the scope of the attached claim or claims, including the full range of equivalency to which each element thereof is entitled.

What is claimed is:

1. A holder for an electrode comprising:
   a body of conductive material having a forward and rearward end, the rearward portion having an insulated cover forming a handle adaptable to be engaged by the hand of the user;
   an electrode support affixed to said body forward end and having an elongated groove in the top surface configured to receive an electrode therein, the electrode support having a forward end and a rearward end;
   an insulated block affixed to said body and spaced from said forward end;
   a pair of elongated paralleled bail members extending from said block and to either side of said electrode support, the bail members each having inner and outer ends;
   an electrode engagement member secured between outer ends of said bail members, an electrode being receivable between the electrode engagement member and said electrode support; and
   a wire lever in the form of a U, the two ends being being inwardly towards each other and pivotally received, one from each side into opposed co-linear openings in the side walls of said electrode support so that the wire lever is pivotal towards and away from said handle, each leg of the wire lever being bent at a sharp angle, the intermediate portion of each leg of the wire lever engaging said bail member on the side thereof opposite said body whereby when the wire lever is pivoted towards said body it serves to deflect said bail members outer ends towards said electrode support and said wire lever is locked in closed position by toggle action.

2. A holder for an electrode according to claim 1 wherein said body has a tubular passageway and therein said electrode support has a passageway therein communicating with said body passageway and with said electrode support front end and including
   means of supplying fluid under pressure to said tubular handle rearward end.

3. A holder for an electrode according to claim 1 wherein said pair of elongated bail members are flexible rods.

4. A holder for an electrode according to claim 1 wherein each of said bail members is bent adjacent the outer end thereof to extend towards each other about a common axis and wherein said electrode engagement means comprises:
   a cylindrical non-conductive member having an axial opening in each end receiving the outer end of said bail members.

5. A holder for an electrode according to claim 4 including:
   a replaceable tubular sleeve received on said cylindrical non-conductive member.

6. A holder for an electrode according to claim 1 wherein each of said bail members is bent adjacent the outer end thereof to extend towards each other about a common axis and wherein said electrode engagement means comprises:

a tubular sleeve; and a pair of non-conductive bushings each having an axial opening therethrough the length of each bushing being less than ½ the length of said sleeve, a bushing being received in each end of said sleeve, and the axial opening of each bushing receiving the outer end of said bail member.

7. A holder for an electrode according to claim 1 including:

a U-shaped protector member extending from said block generally parallel to and spaced from said handle and terminating adjacent said electrode support.

8. A holder for an electrode according to claim 1 wherein:

said bail members are each formed of integral first and second portions, the first portions extending from said block parallel to said body for a selected length and the second portions extending at an angle from said first portions and generally perpendicular to said electrode support.

9. A holder for an electrode according to claim 1 wherein said elongated bail members are each formed of an integral inner and an outer portion, the inner portion extending from said block parallel to said body and in a plane forwardly of said electrode forward end, and the outer portion extending at an angle from said inner portion and generally perpendicular to said electrode support, and the bail members being simultaneously rearwardly deflectable relative to said electrode support to permit placement or positioning an electrode between said electrode engagement member and said electrode support.

10. A holder for an electrode according to claim 9 including a rearward U-shaped protector member extending in a plane parallel and spaced rearwardly from the plane of said bail member outer portions.

11. A holder for an electrode comprising:

an elongated body of conductive material having a forward and rearward end, the rearward portion having an insulated cover forming a handle and adaptable to be engaged by the hand of the user;

an electrode support affixed at its bottom surface to said body forward end and having an elongated groove in the top surface configured to receive an electrode therein, the electrode support having a forward end and a rearward end, the groove being inclined at an angle to the body longitudinal axis;

an insulated block affixed to said body in a plane perpendicular the body longitudinal axis and spaced from said forward end, the block extending above and below the body;

a pair of elongated paralleled bail members of flexible metal rods extending from the lower portion of said block and to either side of said electrode support, the bail members each having inner and outer ends;

an electrode engagement member secured between outer ends of said bail members, an electrode being receivable between the electrode engagement member and said electrode support, said bail members being flexibly biased towards said electrode support upper surface to thereby retain an electrode, and being deflected upwardly to permit placement of an electrode, the bails extending in a plane substantially perpendicular to the longitudinal axis of said electrode support groove.

12. A holder for an electrode according to claim 11 wherein said body has a tubular passageway and wherein said electrode support has a passageway therein communicating with said body passageway and with said electrode support front end and including means of supplying fluid under pressure to said tubular handle rearward end.

13. A holder for an electrode according to claim 11 wherein each of said bail members is bent adjacent the outer end thereof to extend towards each other about a common axis and wherein said electrode engagement means comprises:

a cylindrical non-conductive member having an axial opening in each end receiving the outer end of said bail members.

14. A holder for an electrode according to claim 13 including:

a replaceable tubular sleeve received on said cylindrical non-conductive member.

15. A holder for an electrode according to claim 11 wherein each of said bail members is bent adjacent the outer end thereof to extend towards each other about a common axis and wherein said electrode engagement means comprises:

a tubular sleeve; and a pair of non-conductive bushings each having an axial opening therethrough the length of each bushing being less than ½ the length of said sleeve, a bushing being received in each end of said sleeve, and the axial opening of each bushing receiving the outer end of said bail member.

16. A holder for an electrode according to claim 11 including:

a U-shaped protector member extending from said block generally parallel to and spaced from said handle and terminating adjacent said electrode support.

17. A holder for an electrode according to claim 11 wherein:

said bail members are each formed of integral first and second portions, the first portions extending from said block parallel to said body for a selected length and the second portions extending at an angle from said first portions and generally perpendicular to said electrode support.

18. A holder for an electrode according to claim 11 wherein said elongated bail members are each formed of an integral inner and an outer portion, the inner portion extending from said block parallel to said body and in a plane forwardly of said electrode forward end, and the outer portion extending at an angle from said inner portion and generally perpendicular to said electrode support, and the bail members being simultaneously rearwardly deflectable relative to said electrode support to permit placement or positioning an electrode between said electrode engagement member and said electrode support.

19. A holder for an electrode according to claim 18 including a rearward U-shaped protector member extending in a plane parallel and spaced rearwardly from the plane of said bail member outer portions.

* * * * *